Feb. 7, 1950     L. R. HUSSA     2,496,538
POWER TAKE-OFF
Filed Jan. 21, 1948
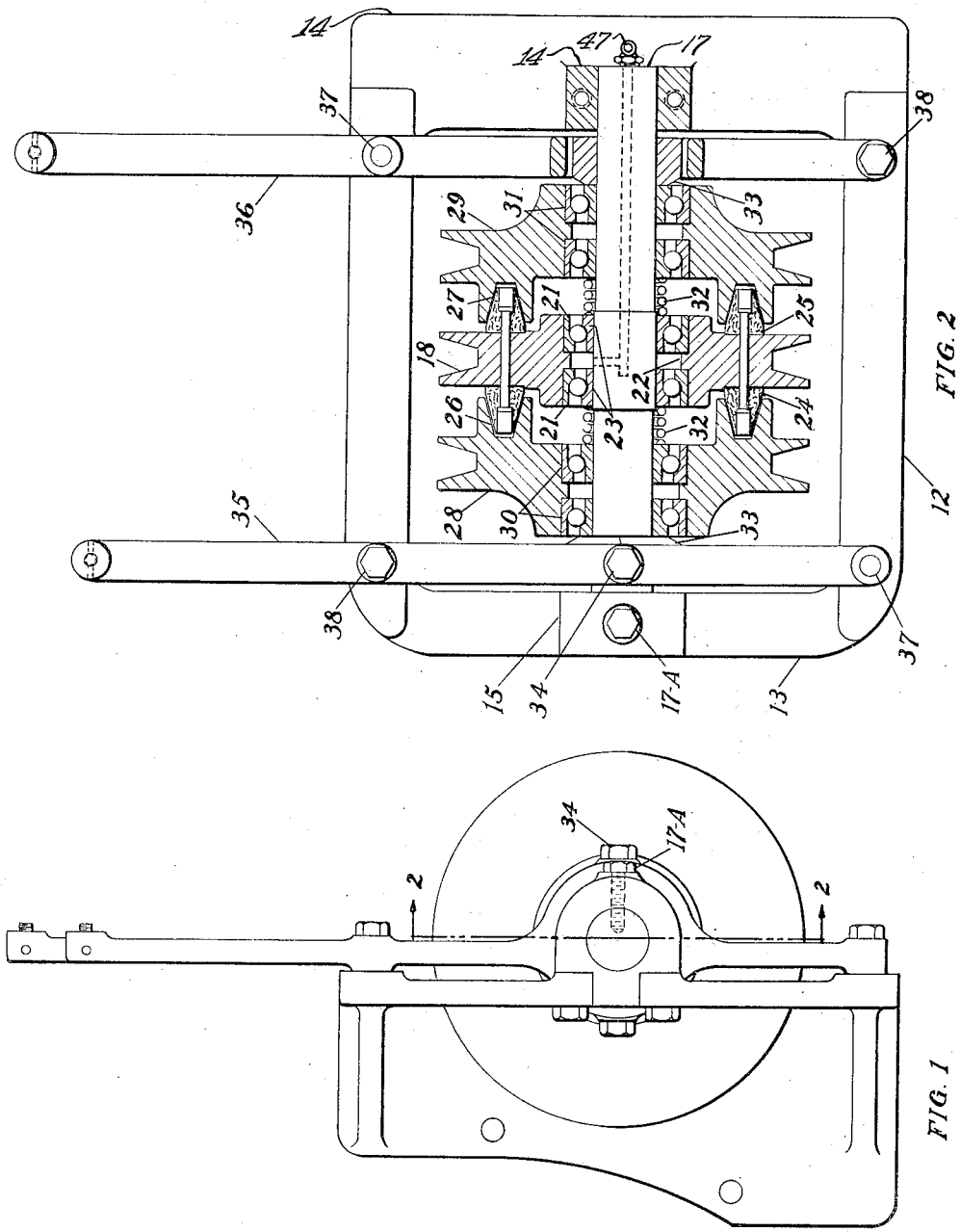
INVENTOR
L.R. HUSSA
ATTORNEY Patented Feb. 7, 1950

2,496,538

UNITED STATES PATENT OFFICE 2,496,538

POWER TAKE-OFF

Leopold R. Hussa, Portland, Oreg.

Application January 21, 1948, Serial No. 3,400

4 Claims. (Cl. 192—48)

This invention relates generally to power transmitting devices and particularly to a power take-off.

The main object of this invention is to produce a power take-off in which the power from a single shaft may be delivered to two separate outlets.

The second object is to produce a device of the class described in which the sheaves and thrust collars work on a non-rotating shaft, thereby eliminating wear and freezing up at high speeds when not in use.

The third object is to construct a power take-off in which little pressure is required on the control levers to engage the take-off sheaves.

I accomplish these and other objects in the manner set forth in the following specification, as illustrated in the accompanying drawing, in which:

Fig. 1 is an end elevation of a power take-off.

Fig. 2 is a partial section taken along the line 2—2 in Fig. 1.

Like numbers of reference refer to the same or similar parts throughout the several views.

Secured to the motor not shown is a somewhat rectangular horizontal frame 12 on whose ends 13 and 14 are mounted the standards 15 and 16 which support the non-rotating shaft 17 which is held by the screw 17—A in the standard 15. On the larger middle portion of the shaft 17 is mounted the fixed center sheave 18 which is driven by a V belt 19 from the drive pulley on the power take-off shaft 20 from the motor. The radial thrust bearings 21 support the sheave 18 on the shaft 17 and they are spaced by the inturned flange 22 within the sheave 18. The bearing cones 23 are pressed on the shaft 17.

On the sides of the sheave 18 are mounted the annular friction elements 24 and 25 which are adapted to engage the annular grooves 26 and 27 in the take-off sheaves 28 and 29 which are provided with radial thrust bearings 30 and 31 both of which are slideable on the shaft 17.

Springs 32 are placed on each side of the bearings 21 and urge the sheaves 28 and 29 away from the sheave 18.

Each sheave 28 and 29 through its bearing 30 or 31 engages a thrust collar 33 by means of which the sheave 28 or 29 may be moved against the urging of the spring 32.

The collars 33 through the bolts 34 are operated by the levers 35 and 36 which are provided with holes 37 for the bolts 38 on either side of the frame 12, one or the other being used depending upon the direction of pull from the operating cable 39 or 40. From the power take-off sheaves 28 and 29 the belts 41 and 42 drive the sheaves 43 and 44 which drive the shafts 45 and 46, illustrated only by way of example, and may be used to operate a bilge pump and cable winding mechanism or for any other purpose without departing from the spirit of this invention.

It can be seen from the foregoing that the thrust collars 33 and sheaves 28 and 29 are all mounted on the non-rotating shaft 17 thereby avoiding wear when the power take-off is not in use.

It can be seen that the bearings can be easily lubricated through the fitting 47 in the end of the shaft 17.

Owing to this arrangement relatively little pull is required on the cables 39 or 40.

It is well known that many forms of power take-off mechanisms have been constructed in the past. I therefore do not intend to cover such devices broadly, but I do intend to cover all such forms and modifications of the device as fall fairly within the following claims.

I claim:

1. A power take-off device having in combination a stationary countershaft, a center sheave mounted on said shaft, radial thrust bearings between said shaft and sheave power take-off sheaves rotatably and slideably mounted on said shaft, friction elements disposed between said center and take-off sheaves, springs for urging said take-off sheaves away from said center sheave and thrust applying means for urging said take-off sheaves against said springs.

2. A power take-off having in combination a rectangular frame, a stationary shaft mounted across said frame, a center sheave fixed along the length of said shaft and rotatable thereon, take-off sheaves rotatable and slideable on said shaft on opposite sides of said center sheave, friction elements disposed between said center sheave and said take-off sheaves, springs for urging said friction elements toward released positions and means for selectively moving said take-off sheaves against the urging of said springs.

3. A power take-off having in combination a rectangular supporting frame, a stationary shaft mounted across the middle of said frame, a center sheave rotatably fixed on said shaft, said sheave having annular friction elements on opposite sides thereof, a take-off sheave on each side of said center sheave, each of which is slideable and rotatable on said shaft, each of said take-off sheaves having annular grooves formed therein to receive the friction elements, springs between said center sheaves and said take-off sheaves for urging same apart to non driving positions and friction applying levers pivoted on said frame having thrust collars connected thereto for urging said take-off sheaves toward friction applying positions.

4. A power take-off having in combination a stationary shaft, a non slideable center sheave and slideable take-off sheaves mounted on said shaft, said take-off sheaves being on opposite sides of said center sheave, radial thrust bearings between said shaft and sheaves, annular friction elements between said center and take-off sheaves, springs on said shaft for urging said friction elements out of engagement, a thrust collar near each shaft end, engaging a take-off sheave and actuating levers for said thrust collars for urging said take-off sheaves into frictional engagement with said center sheave.

LEOPOLD R. HUSSA.

REFERENCES CITED

The following references are of record in the file of this patent:

UNITED STATES PATENTS

| Number | Name | Date |
|---|---|---|
| 285,883 | Fisher | Oct. 2, 1883 |
| 313,284 | Bonds | Mar. 3, 1885 |
| 378,088 | Foote | Feb. 21, 1888 |
| 1,675,086 | Berger | June 26, 1928 |

FOREIGN PATENTS

| Number | Country | Date |
|---|---|---|
| 651,209 | France | of 1929 |